(12) United States Patent
Schmitt

(10) Patent No.: US 6,311,825 B1
(45) Date of Patent: Nov. 6, 2001

(54) RECIRCULATION SYSTEM FOR A ROBOTIC PICKUP

(75) Inventor: Werner H. Schmitt, Falls Church, VA (US)

(73) Assignee: Hoppmann Corporation, Chantilly, VA (US)

( * ) Notice: Subject to any disclaimer, the term of this patent is extended or adjusted under 35 U.S.C. 154(b) by 0 days.

(21) Appl. No.: 09/296,407

(22) Filed: Apr. 23, 1999

Related U.S. Application Data

(60) Provisional application No. 60/082,731, filed on Apr. 23, 1998.

(51) Int. Cl.[7] .................................................... B65G 29/00
(52) U.S. Cl. ........................ 198/392; 198/470.1; 209/919
(58) Field of Search ........................... 198/391, 392, 198/395, 469.1, 470.1; 209/919

(56) References Cited

U.S. PATENT DOCUMENTS

| | | | |
|---|---|---|---|
| 4,007,854 | 2/1977 | Ervins | 198/392 X |
| 4,453,626 | * 6/1984 | Roberts et al. | 198/392 X |
| 4,527,326 | 7/1985 | Kohno et al. | 198/392 X |
| 4,921,106 | * 5/1990 | Spatafara et al. | 209/919 X |
| 5,299,675 | * 4/1994 | Schumann et al. | 198/392 |
| 5,474,493 | * 12/1995 | Tolbert | 198/392 X |
| 5,853,078 | * 12/1998 | Kneubuhler | 198/395 X |

FOREIGN PATENT DOCUMENTS 2-231307   *  9/1990  (JP) ...................................... 198/392

* cited by examiner

Primary Examiner—Tuan N. Nguyen
(74) Attorney, Agent, or Firm—Birch, Stewart, Kolasch & Birch, LLP

(57) ABSTRACT

A recirculating device receives parts in bulk which are bunched together. The device includes a cone-shaped rotating disk which receives the parts and redistributes the parts into separate units. The parts are delivered to an inner periphery of the cone of the cone-shaped disk and then slide down the inclined slope of the cone. As the parts slide down the rotating cone, they become spaced further apart due to the increase in radius of the outer periphery of the cone as compared with the radius of the inner periphery of the cone. The separated parts may then be effectively handled by a picker-type robot utilizing a vision system or sensors to discriminate the individual parts.

20 Claims, 4 Drawing Sheets

RECIRCULATION SYSTEM FOR A ROBOTIC PICKUP

This application is a non-provisional conversion application of provisional application No. 60/082,731 filed on Apr. 23, 1998, the entire contents of which are hereby incorporated by reference.

BACKGROUND OF THE INVENTION

Field of the Invention

The present invention relates to a device for receiving parts in bulk which are bunched together, and redistributing the parts into separate units which may be effectively handled by a picker-type robot utilizing a vision system or sensor means to discriminate the individual parts.

SUMMARY OF THE INVENTION

It is an object of the present invention to provide a device which is simple in structure and which can reliably receive parts in bulk which are bunched together, and redistribute the parts into separate units which may be effectively handled by a picker-type robot utilizing a vision system or sensor means.

The present invention provides a recirculating device including a reservoir which receives parts in bulk that are bunched together. A cone-shaped rotating disk surrounds the reservoir and receives the parts and redistributes the parts into separate units. The parts are delivered to an inner periphery of the cone of the cone-shaped disk, and the parts then slide down the inclined slope of the cone to an outer flat disk surrounding the cone. As the parts slide down the rotating cone, they become spaced further apart due to the increase in radius of the outer periphery of the cone as compared with the radius of the inner periphery of the cone. The separated parts may then be effectively picked up off of the flat disk by a picker-type robot utilizing a vision system or sensor means to discriminate the individual parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more filly understood from the detailed description given hereinbelow and the accompanying drawings which are given by way of illustration only, and thus, are not limitative of the present invention, and wherein.

DETAILED DESCRIPTION OF THE PREFERRED EMBODIMENTS

The invention will be described with reference to a preferred embodiment shown in the accompanying drawings.

Figure 7:
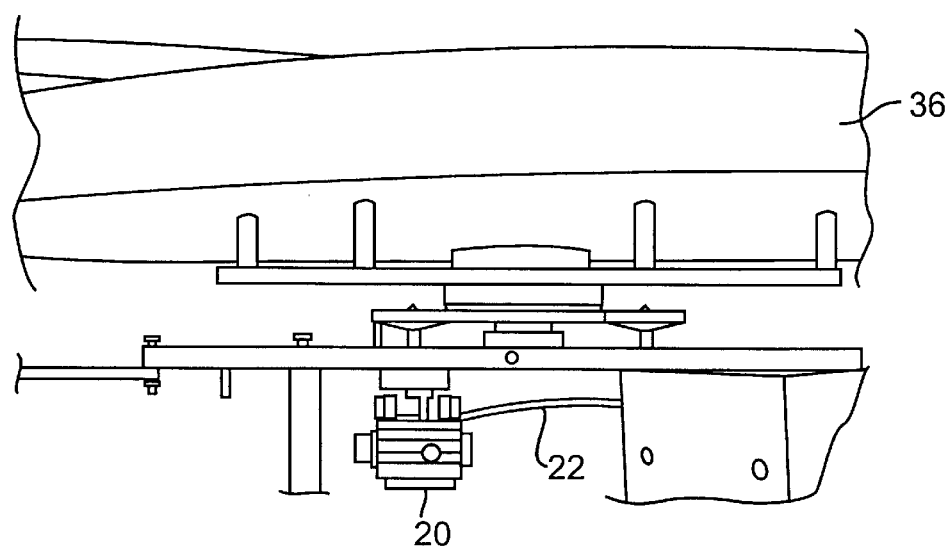
FIG. 7 is a side view showing the drive mechanism of the cone-shaped disk and the free area underneath the flat disk.

A recirculating device 10 includes a central rotating feeder, or centrifugal feeder, as a reservoir 12. Parts are infed to the reservoir 12 from a prefilling device 14. The articles will go to the upper lip of a central rotating disc 15 in the reservoir 12 whereat they will be discharged to an inclined outer cone 16. A deflector 17 may be used to assist movement of the articles from the central rotating disc 15 to the cone 16. Due to the shape of the cone 16, the articles will slide down the cone 16 and spread out in a fan-shaped manner. This arrangement will enable the parts to spread out for subsequent handling by a robotic pickup device 18. The central rotating disc 15 and the outer surrounding cone 16 can be independently driven so as to rotate at the same or different speeds. Independent motors 20, 22 may be used as shown in FIG. 7. These speed variations can be used in order to increase or decrease the spacing between articles. The central rotating disc 15 rotates about an axis which is tilted with respect to vertical, whereas the cone 16 rotates about a vertical axis. As articles slide down the cone 16, they are spaced from one another. The articles will then slide onto a rotating flat disc 24 surrounding the cone 16. The cone 16 and the flat disc 24 can be a one-piece unitary construction or can be molded together or can be two separate parts. Cracks should be avoided in the junction between the cone 16 and the flat disc 24 in order to avoid catching parts when the cone 16 and flat disc 24 are made as two separate elements. Although the flat disc 24 is generally horizontal, it is contemplated that the flat disc 24 may be somewhat inclined.

It is contemplated that the cone 16 and the flat disc 24 will be made of the same element and will therefore rotate simultaneously. Of course, these two elements could also rotate independently of one another if so desired.

The flat disc 24 encircles the cone 16, and the cone 16 encircles the central rotating disc 15 which is the reservoir 12. On the flat disc 24, the parts will be separated from one another. A quarter inch separation is usually the minimal separation needed for a vision system of a robotic pickup device 18. This vision system can spot different articles and then pick them up with the robotic device 18. A very slow speed of rotation or intermittent rotation can be utilized in order to accommodate the robotic device 18. One or more robotic devices 18 may be positioned adjacent the recirculation system 10 in order to pick up the parts from the flat disc 24. Parts will be overfed from the reservoir 12 down the cone 16 to the flat disc 24. In other words, it is contemplated that more parts than will be picked up by the robotic device 18 will be fed from the reservoir 12. The extra, non-picked up parts will be returned to the reservoir 12 by a return mechanism as will be described below.

If parts happen to be touching one another after they slide down the cone 16, the vision system of the robotic device 18 can reject these parts (i.e., simply not pick them up). Because the system overfeeds parts, then an adequate supply of parts is always available for the robotic device 18 or devices.

The flat disc 24 can be made from different materials. For example, if a vision system is used which requires the parts to back-lighted, the flat disc 24 can be transparent or opaque which easily lets light pass therethrough. As can be seen in FIG. 7, there is no drive system beneath the flat disc 24. Because the flat disc 24 is connected or formed integrally with the cone 16, it is the cone 16 that is driven. Therefore the area beneath the flat disc 24 is free of any obstructions. A light source or a plurality of light sources can be provided in the area adjacent the robotic device 18 beneath the flat disc 24. Light from this light source can shine upwardly through the flat disc 24 to provide proper illumination for the vision system of the robotic pick up device 18. Rather than making the entire flat disc 24 from a transparent or opaque material, this flat disc 24 can have a circular strip provided therethrough which is transparent while the remainder of the flat disc 24 is solid or non-transparent. Alternatively, windows can be provided in the flat disc 24 in order to enable light to pass therethrough.

On the other hand, if the articles are not to be back-lit, they can be illuminated from a light source above or adjacent to the robotic device 18. The light would shine from the light source downwardly onto the flat disc 24 and parts thereon. This light would then reflect upwardly to the vision system of the robotic device 18. In such an reflective lighting arrangement, the flat disc 24 can be made from a dark material to enhance operation of the vision system for the robotic device 18. Also, the flat disc 24 could be made from or coated with a fluorescent material. This would enhance operation of the vision system.

Figure 1:
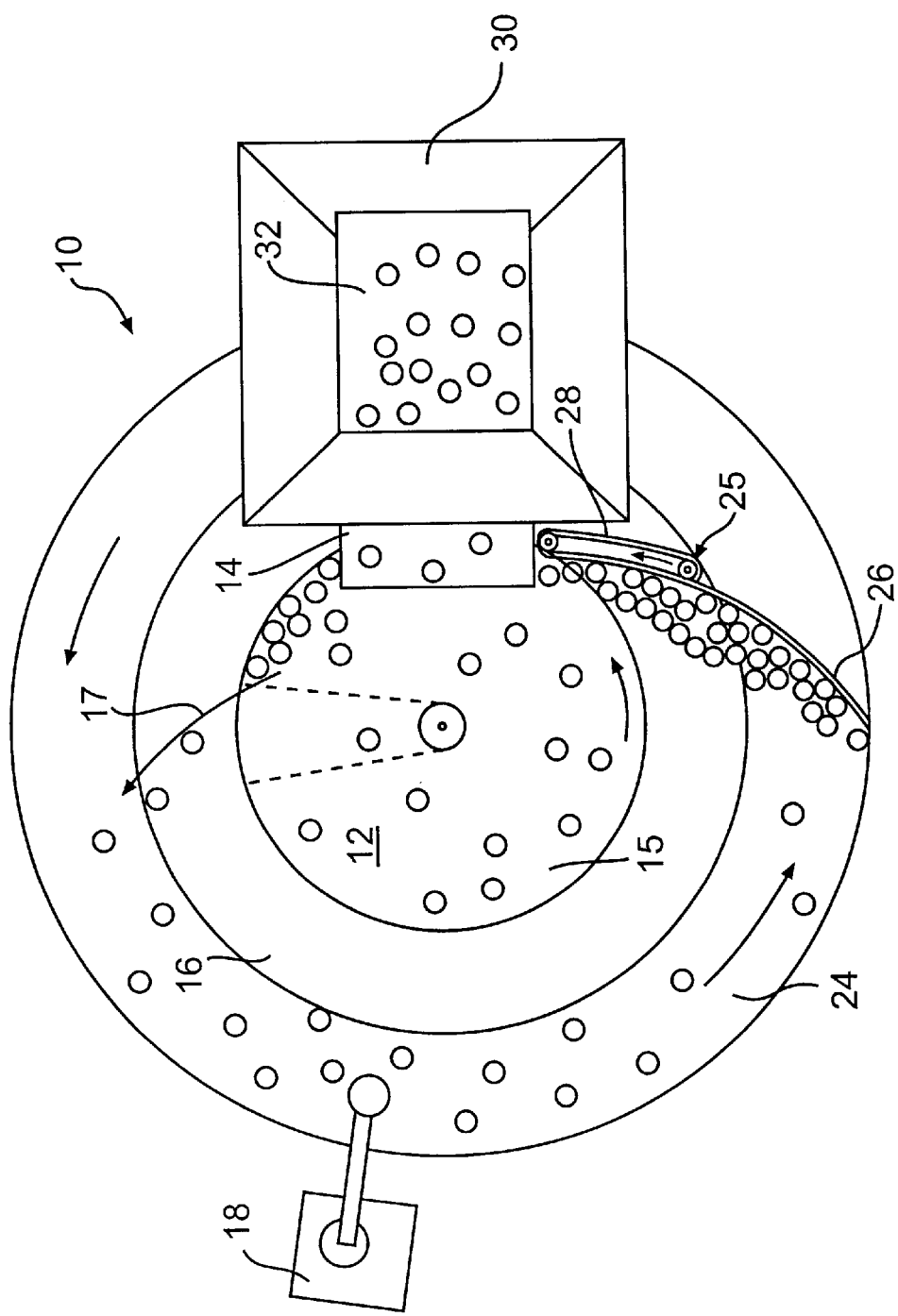
FIG. 1 is a schematic plan view of the recirculating device according to the invention.

As noted above, a return mechanism 25 is provided for feeding parts back to the reservoir 12. These parts can be extra parts which have been overfed from the reservoir 12, can be parts which are improperly oriented and therefore rejected by the vision system of the robotic device 18, or simply any other parts which remain on the rotating flat disc 24. The return mechanism 25 can include a scrapper device 26 which moves the articles from the flat disc 24 to the edge of the cone 16. This scrapper device 26 can terminate at the cone 16 or can proceed up a portion of the cone 16 in order to move articles towards the reservoir 12. Because of the steepness of the cone 16, it is likely that a scraper device 26 alone would be insufficient Therefore, a return belt conveyor 28 is provided. This return conveyor 28 will be at an angle relative to a radial line emanating from the center of the reservoir 12 as seen in FIG. 1. The return conveyor 28 will be driven to move parts up the cone 16. At the top of the cone 16, the articles will simply fall back into the reservoir 12. In the reservoir 12, a sensor device can be provided. When it is detected that an insufficient number of parts are provided in the reservoir 12, this will activate operation of the prefilling device 14.

Figure 2:
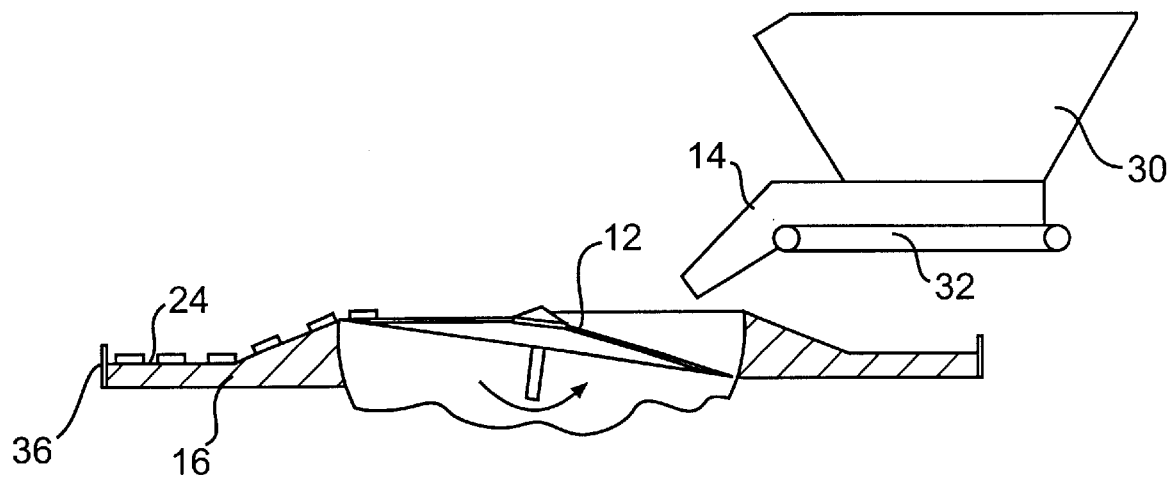
FIG. 2 is a schematic partial cross-sectional side view thereof.

As seen in FIGS. 1 and 2, this prefilling device 14 can be bulk hopper 30 with a conveyor 32 which simply feeds articles to the reservoir 12. The articles will drop from the conveyor 32 into the reservoir 12 by gravity. This feeding is a trickle effect whereby articles are simply fed. Because it is not required to lift the articles from the bulk hopper 30 to the reservoir 12, the overall prefeeding arrangement can be simplified. However, it is possible to use a hopper which is below the height of reservoir 12 whereby a conveyor would be used to lift and drop articles into the reservoir 12. Other arrangements for filling the reservoir 12 are also contemplated.

Figure 3:
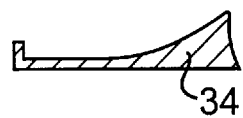
FIG. 3 is a cross-sectional view of a portion of a modification of the cone according to the invention.
Figure 4:
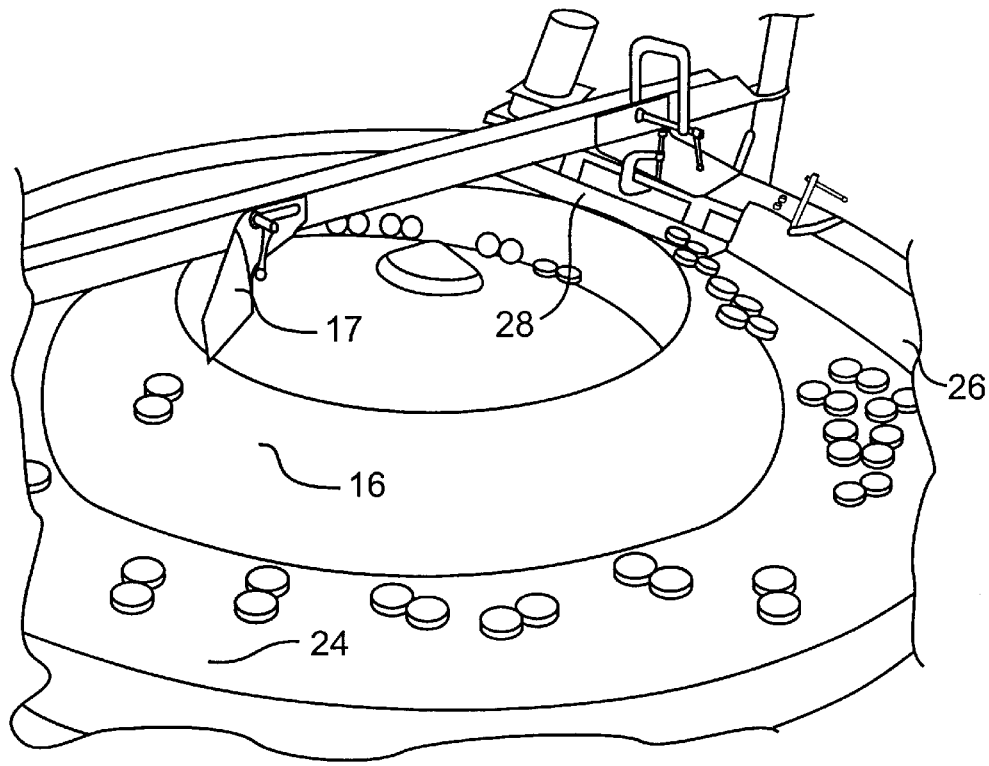
FIG. 4 is a perspective view of the recirculating device showing the reservoir.
Figure 5:
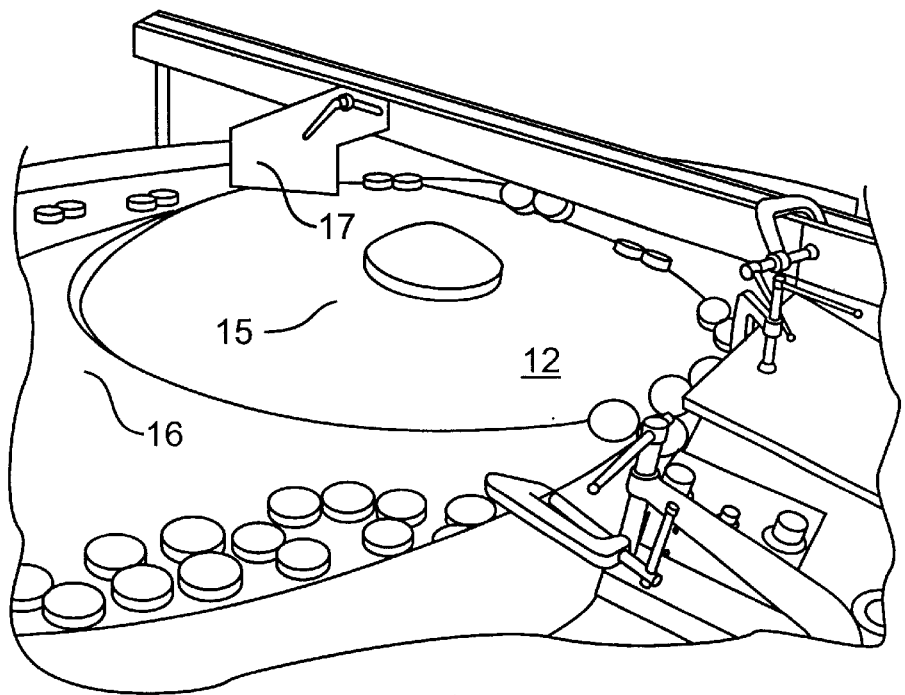
FIG. 5 is a perspective view showing the parts travelling up in the reservoir for discharge onto the cone-shaped disk.
Figure 6:
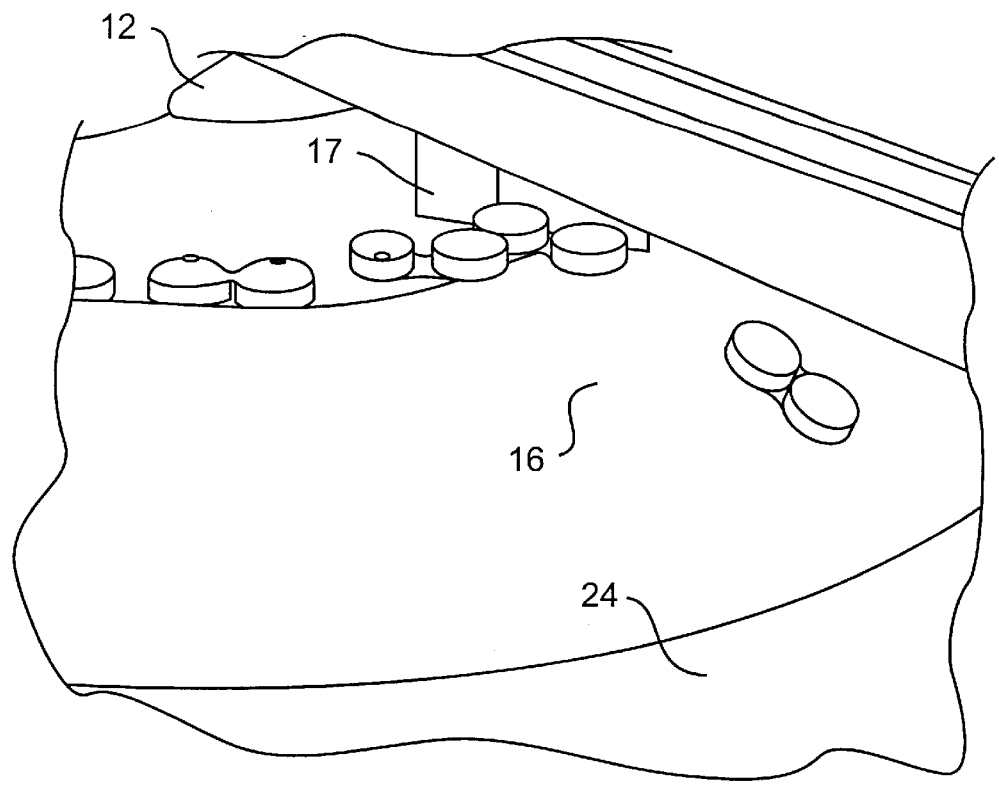
FIG. 6 is a view showing one of the parts sliding down the sloped surface of the cone-shaped disk.

When discussing the cone 16, the straight inclined surface thereof shown in FIGS. 2 and 4–6 has a straight shape. However, a convex or concave inclined surface could be used, as shown in FIG. 3. These different shapes can affect the spreading out of articles as they are fed from the reservoir 12 onto the flat disc 24 from the cone 16. Also, if a concave cone 34 is used as shown in FIG. 3, then contact with the scraper device 26 and/or conveyor belt 28 of the return mechanism which would overlie the concave cone 34 can be ensured. In other words, a gap beneath the conveyor 28 of the return mechanism will be avoided. This will prevent small parts from being trapped and ensure proper feed into the device. Of course, if parts of this are of a sufficient size, then this gap may not be a problem and a straight-shaped cone 16 or convex shaped cone can be used. As seen in FIGS. 1 and 4, the angle of the return conveyor belt 28 of the return mechanism relative to a radial line from the center of the reservoir 12 is such that the bottom of the conveyor belt 28 can be substantially flush with the upper surface of the cone 16. In this arrangement, the gap is prevented as noted above.

The flat disc 24 can have an outer rim 36 if so desired. This outer rim 36 can be an integral one-piece structure with the flat disc 24. In other words, the cone 16, flat disc 24 and outer rim 36 can all be a one-piece construction, or these elements can be of different material. If the outer rim 36 is of a one-piece construction with the flat disc 24, then this outer rim 36 will obviously rotate simultaneously with rotation of the flat disc 24. However, a stationary outer rim could also be used if so desired. This stationary outer rim would be separate from the flat disc 24 and would serve to prevent articles from falling from the flat disc 24 as it rotates. Because the speed of the flat disc 24 is relatively slow, centrifugal forces are normally not a problem whereby the articles do not tend to roll from the flat disc 24. This slow rate of rotation is necessary when working with robotic devices 18.

If a stationary outer rim is provided, care should be taken that a gap between the stationary outer rim and the flat disc 24 is avoided in order to avoid catching parts therein. Of course, when handling certain size parts, a small or minimal gap can be of no consequence. With a stationary outer rim, a gap can be provided adjacent the robotic pick up area. In that manner, the robotic device 18 can move the article horizontally from the flat disc 24 rather than having to lift the article. Of course, a little lifting of the article could be carried out but because the stationary outer rim is broken in this section, the robotic device 18 need not lift the article over the stationary outer rim. This can simplify operation of the robotic device 18.

The surface of the flat disc 24 can also be made rough or have suitable configuration in order to accommodate the articles being held. For example, if cylindrical articles will be handled, then grooves can be provided in the flat disc 24 such that the articles will not roll thereby making it easy for the robotic device 18 to pick them up. Other textures can be provided for the outer surface of the flat disc 24, such as a non-skid, sandpaper-like surface.

The cone 16, on the other hand, is contemplated as having a flat smooth surface in order to allow parts to easily slide down its face. However, grooves for preorienting the parts or other texture can also be provided in the cone 16 as so desired. For example, if cylindrical parts are being handled, grooves can be provided in the cone 16 in order to preorient the parts in a desired direction.

With this recirculating system 10, parts can be separated from one another so that they do not touch. This helps the robotic pickup device 18 properly pick up the articles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article recirculating system comprising:
   a reservoir for receiving a plurality of articles therein;
   a rotatable feeding device located in said reservoir for feeding said articles from said central reservoir; and
   an article separating device rotatable about said reservoir for receiving said articles fed from said feeding device, said article separating device including
     an inclined surface down which said articles slide which aids separation of said articles from one another, and
     a flat surface located adjacent an outermost peripheral portion of said inclined surface for receiving thereon said articles from said inclined surface and which permits radial spreading of said articles on said flat surface.

2. The article recirculating system according to claim 1, said article separating device further comprising a rim located adjacent an outermost peripheral portion of said flat surface and extending upwardly above a level of said flat surface.

3. The article recirculating system according to claim 1, wherein said inclined surface and said flat surface are formed as a one-piece unitary member.

4. The article recirculating system according to claim 1, wherein at least a portion of said flat surface is transparent.

5. The article recirculating system according to claim 1, wherein at least a portion of said flat surface is opaque.

6. The article recirculating system according to claim 1, wherein said flat surface is generally horizontal.

7. The article recirculating system according to claim 1, wherein said inclined surface is straight.

8. The article recirculating system according to claim 1, wherein said inclined surface is concave.

9. The article recirculating system according to claim 1, wherein said inclined surface is convex.

10. The article recirculating system according to claim 1, wherein said article separating device is rotatable about a substantially vertical first axis, and said feeding device is rotatable about a second axis tilted with respect to said first axis.

11. The article recirculating system according to claim 10, further comprising a drive mechanism for rotating said article separating device and said feeding device about said first axis and said second axis, respectively.

12. The article recirculating system according to claim 1, further comprising a scraping mechanism extending along a portion of said flat surface and a portion of said inclined surface for returning articles to said reservoir.

13. The article recirculating system according to claim 12, wherein said scraping mechanism includes a belt conveyor to assist movement of said articles up said inclined surface.

14. The article recirculating system according to claim 1, further comprising a robotic device for removing said articles from said article separating device.

15. The article recirculating system according to claim 14, wherein said robotic device includes a vision system for locating said articles on said article separating device.

16. The article recirculating system according to claim 1, further comprising a hopper for supplying said articles to said reservoir.

17. A method of separating articles in bulk comprising the following steps:
   providing a plurality of articles in a reservoir;
   feeding said articles from said reservoir to an article separating device having an inclined surface and a flat surface located adjacent an outermost peripheral portion of said inclined surface;
   rotating said article separating device while receiving said articles fed from said reservoir on said inclined surface of said article separating device; and
   allowing said articles to slide downwardly along said inclined surface and spread radially outwardly along said flat surface as said article separating device rotates, thereby separating said articles on said flat surface from one another.

18. The method according to claim 17, further comprising the step of sliding said articles onto a flat surface surrounding said inclined surface.

19. The method according to claim 18, further comprising the step of picking said articles off of said flat surface utilizing a robotic pick-up device.

20. The method according to claim 17, wherein said article separating device is rotatable about a substantially vertical first axis, and said articles are fed from said reservoir by a feeding device rotatable about a second axis titled with respect to said first axis.

* * * * *